Sept. 25, 1934.   A. Y. DODGE   1,974,809
LUBRICATION DEVICE
Filed Feb. 8, 1932   2 Sheets-Sheet 1

INVENTOR.
ADIEL Y. DODGE
BY
ATTORNEY.

Sept. 25, 1934.  A. Y. DODGE  1,974,809
LUBRICATION DEVICE
Filed Feb. 8, 1932   2 Sheets-Sheet 2
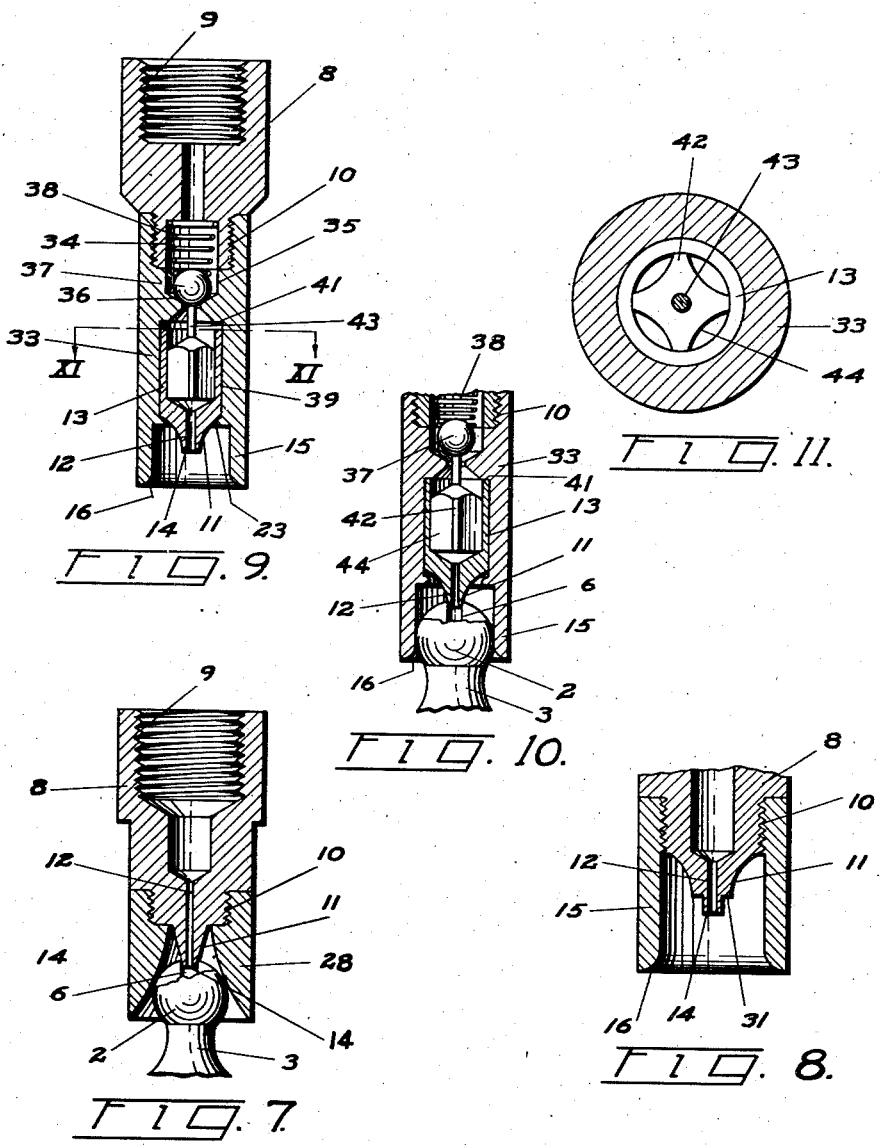

Patented Sept. 25, 1934

1,974,809

UNITED STATES PATENT OFFICE 1,974,809

LUBRICATION DEVICE

Adiel Y. Dodge, South Bend, Ind., assignor to The Lubrication Corporation, South Bend, Ind., a corporation of Delaware Application February 8, 1932, Serial No. 591,537

2 Claims. (Cl. 285—161)

This invention relates to improvements in lubrication devices and particularly to lubricant discharge nozzles for use in servicing lubrication fittings or nipples associated with bearings and the like.

An object of the invention is to provide a lubricant discharge nozzle adapted to enter the lubricant port of a lubrication fitting or nipple wherein the port is located upon the wall of a spherical head.

Another object is to provide a lubricant discharge nozzle of the type described wherein means is provided for aiding in the alignment of the nozzle and lubricant port of the fitting.

Another object is to provide a lubricant discharge nozzle having contact surfaces for engaging the spherical surface of the fitting head to permit the nozzle to be moved about said surface until the outlet port thereof is aligned and introduced into the lubricant port of the fitting located on said surface.

Other objects and advantages and uses of the invention will be or should become apparent after reading the following specification and claims and after consideration of the accompanying drawings forming a part of this application, in which:

Figure 7 is a sectional view illustrating a further modification of the discharge nozzle;

Figure 8 is a sectional view of another modification of the discharge nozzle;

Figure 9 is a sectional view of a further modification of the discharge nozzle including an automatic discharge valve;

Figure 10 is a view similar to Figure 9 but with the parts in that position occupied during the servicing operation; and Figure 11 is an enlarged sectional view along the line XI—XI of Figure 9.

I am well aware that lubricant discharge nozzles have been provided heretofore having parts adapted to enter a relatively small lubricant port in a fitting or nipple so as to cooperate with the side walls of the port to effect a lubricant tight seal and that such nozzles have further been provided with guide means to limit the lateral movement of the nozzle after its initial engagement of the fitting until the parts are properly aligned and interconnected for service. However, such structure as has been suggested is not applicable in the solution of the problem confronted in the servicing of a lubricant fitting or nipple having its inlet port disposed upon a spherical head.

I have provided, in the structure hereinafter described, a discharge nozzle which is so constructed as to permit the movement of the nozzle over any part of the spherical head without lateral movement until that portion of the nozzle including the outlet orifice is properly aligned and entered within the lubricant port of the fitting.

Figure 1:
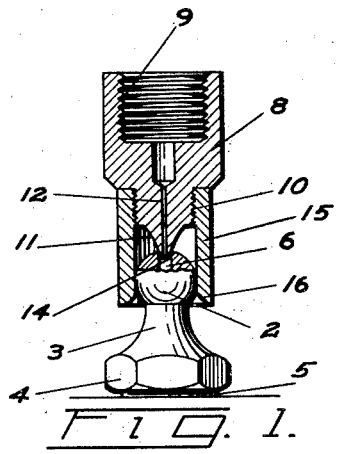
Figure 1 is a view partially in section of one embodiment of my invention with the parts arranged in their operative position as during the lubricant feeding operation.
Figure 2:
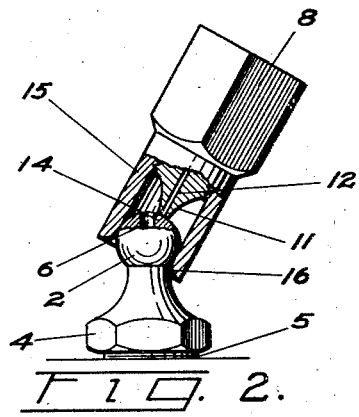
Figure 2 is a view of the parts illustrated in Figure 1 as they may appear during the procedure of aligning nozzle and fitting.

In Figures 1 and 2 I have shown one form of my improved nozzle as employed in combination with a lubricant fitting or nipple of the type illustrated and described in the patent to Morris, Reissue No. 18,123. This fitting comprises an enlarged spherical head 2, a neck 3, an intermediate body portion 4 and a shank 5 by means of which the fitting is associated with a bearing or similar part. In the drawings a portion of the head 2 is shown in section to illustrate more clearly the exact position of the lubricant port 6 which, in the present instance, is disposed centrally of the head 2.

The nozzle comprises a body portion 8 having an internally threaded bore 9 by means of which the nozzle may be secured to a lubricant conducting hose or other lubricant feed apparatus. The outer end of the nozzle has a reduced external threaded portion 10 which terminates in a centrally disposed fitting contact portion 11 having concave converging side walls. A lubricant passage 12 communicating with the bore 9 extends centrally through the portion 10 and has one end located centrally of the converging side wall extension. While I have here described the contact portion 11 as having converging side walls I shall hereinafter use this term to include all side walls of the fitting contacting portion of the nozzle wherein the wall is generated by straight or curved line rotated at an angle to and about the axis of the nozzle. In other words, converging side walls is to be interpreted as including a conical side wall, a tapered side wall as shown in Figure 11 but wherein the walls are slightly concave and walls which, while not being spherical, have converging convex surfaces.

The outer end of the portion 11 is sufficiently small as to enter for a short distance within the port 6 of the fitting and to form a lubricant tight seal between the mouth of the port and its side walls by an annular metal to metal contact.

Obviously it would be totally impractical to employ the nozzle thus described in the servicing of a spherical head fitting as considerable difficulty would be encountered each time in aligning the axis of the portion 11 with the lubricant port of the fitting. To overcome this difficulty which is peculiar to spherical head fittings and which is not present in fittings having substantially broad concave or flat surfaces adjacent to their outlet ports I provide a guide sleeve 15 having an internally threaded portion at its inner end by means of which it is secured to the externally threaded portion 10 of the body 8. The internal diameter of the guide sleeve 15 is such as to just clear the side of the spherical head 2 at its point of maximum thickness. The lower and inner edge of the sleeve 15 is rounded as shown at 16 so as to clear the fitting neck 3 as shown in Figure 2.

In use this type of discharge nozzle is first applied to the fitting as illustrated in Figure 2 with no particular attempt to align the axis of the portion 11 with the outlet port 6. All that is necessary is that the head 2 lie within the sleeve 15 in such a manner as to provide a universal contact between the head and the sleeve. It will be noted that while in this position lateral movement of the nozzle is impossible and that in fact the only movement possible is one in which the reduced end 14 of the portion 11 wherein the outlet port is located, may contact with and ride over the outer surface of the head to traverse the spherical surface until such time as its axis is aligned with the port 6. When this occurs the occasion of the alignment is made known to the operator by the longitudinal movement of the nozzle as the contacting surface 14 drops into the port 6. The parts are now in the position shown in Figure 1 and with very slight pressure between nozzle and fitting a tight lubricant seal is established such as to permit the feeding of the lubricant to the fitting or nipple under high pressures.

Figure 3:
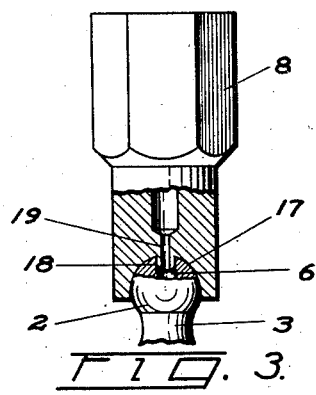
Figure 3 is an elevation, partially in section illustrating a modification of the lubricant nozzle structure.

In Figure 3 I have illustrated a modification of the nozzle which may be constructed of a single piece of steel stock, the outer end of which has a spherical recess 17 conforming exactly to the curvature of the outer surface of the spherical head 2. A projection 18, centrally disposed in the recess 17, is formed integrally with the body of the nozzle and has an outer diameter such as to permit its entry within the port 6. A lubricant conducting passage 19 extends through the body of the nozzle and thru the portion 18 by means of which the lubricant is conducted to the fitting when the nozzle and fitting are in the relative position shown in the drawings. This type of nozzle does not possess the advantages of self-alignment through rotation of the nozzle about the center of the spherical head but does provide for the rotating of the parts of the nozzle and fitting relative to one another by lateral and pivotal movement of the nozzle over the head, and a seal therebetween when proper relationship is established having maximum contact between adjacent surfaces, so that leakage of lubricant at the point of interconnection, even though the parts are considerably worn and pitted, is not likely to occur.

Figure 4:
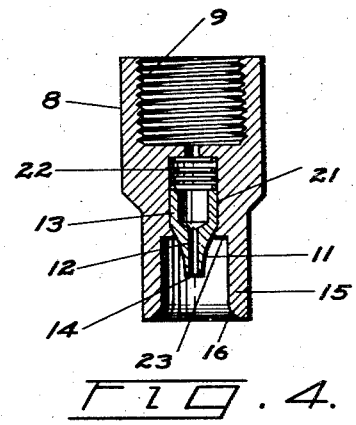
Figure 4 is a sectional view of a further modification of the lubricant nozzle.

The discharge nozzle illustrated in Figure 4 is similar in many respects to that shown in Figures 1 and 2 and like reference numerals have been used to designate like parts. It differs, however, in that the sleeve 15 is formed integral with the body 8 and the fitting contact portion 11 is formed upon a cylindrical member 13 which is slidably supported within a bore 21 communicating with the internally threaded bore 9 of the body 8.

A lubricant tight contact is maintained between the outer wall of the member 13 and the bore 21 and a compression spring 22 is disposed within the bore at the rear of the member 13 to urge it outwardly against a stop formed by swaging the mouth of the bore inwardly as shown at 23.

This type of nozzle is applied to the fitting or nipple of the spherical head type in precisely the same manner as described in connection with the nozzle illustrated in Figures 1 and 2, except that continued thrust upon the nozzle after the surface 14 has contacted with the spherical surface of the head 2 will result in relative movement between the member 13 and the body 8 with its integral sleeve 15 to compress the spring 22. The fitting contact member 13 is therefore constantly being urged toward the fitting head so that when it has been moved into alignment with the port 6 of the head, it will be immediately thrust inwardly of the port to establish operative communication between nozzle and fitting. Continued thrust upon the nozzle will firmly and positively seal the fitting contact member 13 with the fitting for high pressure servicing at which time the spring 22 is tightly compressed to augment the sealing of the passage between the bore 9 and the passage 12.

Figure 5:
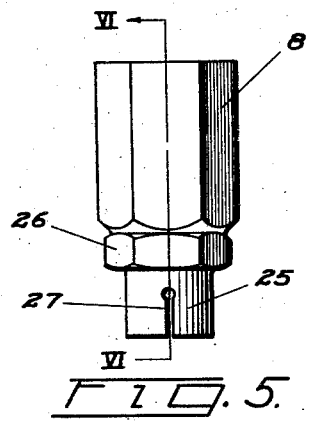
Figure 5 is an elevation of another modification of the lubricant discharge nozzle.
Figure 6:
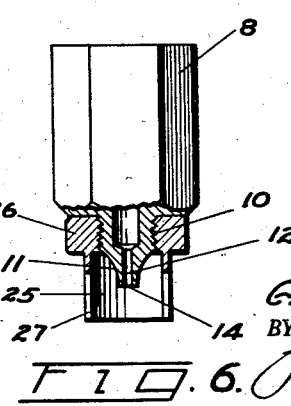
Figure 6 is a view, partially in section along the line VI—VI of Figure 5.

In Figures 5 and 6 I have illustrated a further modification of the nozzle which is similar in many respects to that shown in Figures 1 and 2 but differs in that the guide sleeve 15 is replaced by a thin walled split sleeve 25 having an enlarged wrench engaging portion 26 which is internally threaded to be received upon the externally threaded portion 10 of the body 8. The sleeve 25 is slotted longitudinally at its outer end on diametrically opposite sides as shown at 27.

The internal diameter of the split guide sleeve 25 may be slightly less than the diameter of the spherical head 2 of the fitting so that the sleeve is caused to expand slightly to insure a close contact with the spherical surface of the head as it is rocked over the head during the procedure of locating the end 14 of the contact portion 11 of the nozzle over the lubricant port 6 of the fitting. The seal effected by contact of nozzle and lubricant port is the same as that described in connection with Figures 1, 2 and 4 of the drawings.

Another modification of the discharge nozzle is illustrated in Figure 7 wherein the fitting contact portion 11 is formed with conical side walls as distinguished from the concave converging side walls illustrated in the preceding figures. The nozzle has a sleeve 28 which differs from the sleeve 15 in that its inside wall is convex and flared outwardly. It is secured to the body 8 by engagement with the externally threaded portion 10 thereof.

The purpose of the outwardly flaring, convex surfaced, guide sleeve 28 is to easily locate the spherical head 2 of the fitting initially within the sleeve, which function is made possible by forming the internal diameter of its outer end considerably in excess of the diameter of the head 2 of the fitting.

In order to assume proper contact between the conical surfaced contact member 11 and the port 6 of the fitting it is essential that the internal diameter of the sleeve 28, at that point adjacent to the center of the head 2 when the nozzle and fitting are interconnected as shown in the drawings, be slightly greater than the diameter of the head.

In use this type of nozzle is quickly located over the head of the fitting because of the enlarged end opening of the sleeve 28 and the engagement of the contact portion 11 and the lubricant port 6 may be then brought about by moving the nozzle over the surface of the spherical fitting head as previously described.

In Figure 8 a modification of the fitting illustrated in Figure 1 is shown wherein the tip of the fitting contact portion 11 is annularly grooved as shown at 31 to provide a cylindrical walled portion adapted to enter and contact with the inner side walls of the port 6 of the fitting. In all other respects and in method of operation the nozzle is identical to that first described.

In Figures 9, 10 and 11 I have shown a nozzle similar to that illustrated in Figure 4 but including in addition a valve which is normally closed to prevent the flow of lubricant therethru and which is automatically opened when the nozzle and fitting are properly interconnected in sealed relationship with one another.

The sleeve 15 is formed integrally with a member 33, the inner end of which is secured to the body 8 by engagement with the externally threaded portion 10 thereof. The outer end of the body 8 has a recess 34 therein which registers with a recess 35 of like diameter in the inner end of the member 33. The lower end of the recess 35 is formed with a centrally apertured valve seat 36 against which a valve ball 37 is urged by a compression spring 38, both of which are disposed within the aligned recesses 34 and 35. The member 13 is slidably mounted in a bore 39 communicating with the apertured valve seat 36 at its inner end and swaged in at its mouth as shown at 23 to retain the member 13 within the bore.

The inner end of the bore 39 is formed with a shoulder 41 against which the adjacent end of the member 13 may rest to limit its retractile movement and to form a seal therewith as shown in Figure 10 as when the nozzle and fitting are interconnected as shown in Figure 10.

Means for opening the ball valve by lifting the ball 37 from its seat when the member 13 is retracted, as by pressure upon the nozzle directed against the fitting, comprises a member 42 disposed within the bore of the member 13 and having an integral rearwardly extending push rod 43 which just clears contact with the ball 37 when the member 13 is in its normal position as shown in Figure 9.

In use the nozzle illustrated in Figures 9 to 11 is applied to the fitting and contact established between the portion 11 and the port 6 of the fitting in the manner described in connection with Figure 4. So long as the member 13 is held inwardly of the bore 39 the valve of the nozzle will be held open to permit the passage of lubricant therethru and the contacting surfaces of the inner end of the member 13 and the shoulder 41 will effect a lubricant tight seal therebetween to prevent leakage between the movable parts of the nozzle.

In order to assume free passage of lubricant past the member 42 it is formed with fluted side walls as shown at 44 in Figure 11.

It is to be understood that the above described embodiments of the invention are for the purpose of illustration only, and various changes may be made therein without departing from the spirit and scope of the invention.

I claim:

1. A lubricant discharge nozzle for use with a lubricant fitting having a spherical head provided with a port therein, comprising, a lubricant conducting member having one end formed with convergent side walls adapted to enter the port in said fitting head, and a cylindrical guide sleeve of uniform diameter fixed relative to said conducting member and adapted to embrace and to contact with the outer wall of said spherical head of said fitting to provide universal engagement therewith in a plane including the center of the head, said sleeve extending beyond the outer end of said convergent wall conducting member a distance sufficient to assure engagement of the inner wall thereof with the outer wall of the spherical fitting head in a plane including the center of the head prior to the entry of the conducting member into the inlet port of the fitting.

2. A lubricant discharge nozzle, for use with a lubricant fitting having a spherical head provided with a lubricant port therein, comprising, a lubricant conducting member adapted for connection with a source of lubricant supply at one end and fashioned at its opposite end with a portion adapted to enter the port in said spherical head, a shoulder formed on said portion adapted to engage with the outer surface of said fitting head adjacent to said port to limit the entry of said portion into said port and to provide sealing contact with the fitting, and a member fixed relative to said conducting member arranged to encompass, and to circumferentially contact with, the spherical head of said fitting to provide universal engagement of the nozzle therewith, whereby the nozzle may be moved angularly about the center of said spherical head to align said lubricant conducting and fitting contacting member with said lubricant port in said fitting head.

ADIEL Y. DODGE.